United States Patent Office 3,356,652
Patented Dec. 5, 1967

3,356,652
NOVEL MONOMERIC SUGAR DERIVATIVES
Dilip Kumar Ray-Chaudhuri, Toronto, Ontario, Canada, assignor to National Starch and Chemical Corporation, New York, N.Y., a corporation of Delaware
No Drawing. Filed Mar. 17, 1964, Ser. No. 352,661
36 Claims. (Cl. 260—78.4)

ABSTRACT OF THE DISCLOSURE

A group of ethylenically unsaturated sugar derivatives capable of undergoing vinyl type polymerization reactions either alone or in the presence of other vinyl type comonomers; said derivatives being prepared by means of a process involving the reaction of a 2,3,4,6-tetra-O-acetyl α-D-glucopyranosyl halide with an ethylenically unsaturated monomer selected from the group consisting of monohydroxy and monocarboxy substituted ethylenically unsaturated monomers.

This invention relates to the preparation of ethylenically unsaturated sugar derivatives, the novel derivatives thus prepared, as well as to the polymers derived therefrom.

Inasmuch as sugars are materials which are available in great abundance and are extremely low in cost, many attempts have been made to utilize them for the preparation of high polymers. For the most part these efforts have involved the use of sugars in condensation reactions leading to the formation of polyester type resins. However, where these efforts have involved the derivitization of sugars so as to provide them with ethylenic unsaturation the resulting polymers prepared by means of addition polymerization techniques have ordinarily been brittle, highly crosslinked, thermoset products. More recently, however, monomeric, i.e. polymerizable, sugar derivatives have been prepared by means of a transesterification procedure

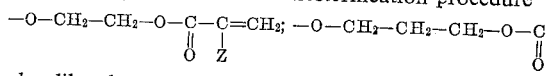

whereby diketal sugar derivatives are reacted with a lower alkyl ester of an alpha,beta-ethylenically unsaturated acid. Thus, although the polymers prepared from these monomeric sugar derivatives are found to be non-crosslinked, thermoplastic materials, the process utilized for their preparation is handicapped by the need for a rather complex and time consuming series of separation and purification steps including an azeotropic distillation which must be conducted at extremely high temperatures in the range of about 100° C.

It is, therefore, the prime object of this invention to produce a novel class of ethylenically unsaturated sugar derivatives, said derivatives being capable of undergoing vinyl type polymerization reactions either alone or in the presence of other vinyl type comonomers. It is a further object of this invention to prepare such monomeric sugar derivatives by means of a relatively simple procedure which may be conducted at moderate temperatures. An additional object of this invention involves the preparation, from these ethylenically unsaturated sugar derivatives, of homo- and copolymers which are thermoplastic in character and may be produced in a form wherein the respective polymers are either soluble or insoluble in water. Various other objects and advantages of this invention will be apparent from a reading of the disclosure which follows hereinafter.

The novel monomeric sugar derivatives of this invention are derivatives of glucose having ethylenically unsaturated side chains which are derived from ethylenically unsaturated monomers selected from the group consisting of monohydroxy substituted and, monocarboxy substituted ethylenically unsaturated monomers; said glucose derivatives being selected from the group consisting of monoether and monoester derivatives of 2,3,4,6-tetra-O-acetylglucose wherein the ethylenically unsaturated side chains of said glucose derivatives are linked to the number 1 carbon of the 2,3,4,6-tetra-O-acetylglucose molecule by means of a linkage selected from the group consisting of oxy, i.e. —O—; and, oxycarbonyl, i.e.

$$-O-\underset{\underset{O}{\|}}{C}-$$

linkages, the latter linkages being derived, respectively, from the hydroxy group of said monohydroxy substituted ethylenically unsaturated monomers and the carboxy group of said monocarboxy substituted ethylenically unsaturated monomers.

These derivatives correspond to the formula:

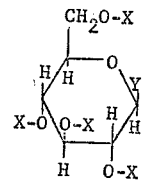

wherein X is an acetyl radical, i.e.

wherein Y is a radical selected from the group consisting of the

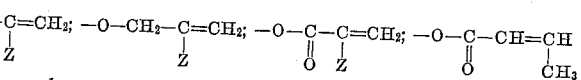

and

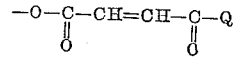

radicals, wherein Z in the latter radicals may be selected from the group consisting of the hydrogen, i.e. —H, and methyl, i.e.—CH$_3$, radicals and wherein Q in the latter radicals is an oxylakyl group containing from 1 to 4 carbon atoms.

The following list is representative of the monomeric sugar derivatives of this invention:

(1a) 2,3,4,6-tetra-O-acetylglucoxyethyl methacrylate
(1b) 2,3,4,6-tetra-O-acetylglucoxyethyl acrylate
(2a) 2,3,4,6-tetra-O-acetylglucoxypropyl methacrylate
(2b) 2,3,4,6-tetra-O-acetylglucoxypropyl acrylate
(3a) 1-O-allyl 2,3,4,6-tetra-O-acetylglucoside
(3b) 1-O-methallyl 2,3,4,6-tetra-O-acetylglucoside
(4a) 2,3,4,6-tetra-O-acetylglucosyl methacrylate
(4b) 2,3,4,6-tetra-O-acetylglucosyl acrylate
(5) 2,3,4,6-tetra-O-acetylglucosyl crotonate
(6) 2,3,4,6-tetra-O-acetylglucosyl methyl maleate
(7) 2,3,4,6-tetra-O-acetylglucosyl butyl fumarate Thus, it is seen that the derivatives of this invention may be described as monomeric sugar derivatives; or, more specifically, as ethylenically unsaturated monoether and monoester derivatives of 2,3,4,6-tetra-O-acetylglucose wherein the respective ethylenically unsaturated, i.e. vinyl, substituent side chains are linked to the tetra-O-acetyl-glucose molecule via its number 1 carbon atom. All of the above listed compounds, as well as any others which correspond to the above given definition and formula, are materials which are capable of readily undergoing vinyl type polymerization reactions. They are thus useful for the preparation of homopolymers as well as copolymers with other vinyl type comonomers.

In brief, the synthesis of these novel derivatives is accomplished by the reaction of a glucose intermediate, comprisng a 2,3,4,6-tetra-O-acetyl α - D - glucopyranosyl halide, with an ethlenically unsaturated monomer selected from the group consisting of monohydroxy substituted and monocarboxy substituted ethylenical-unsaturated monomers. Hereinafter, the latter glucose intermediates will, for purposes of brevity, be more simply referred to as the tetraacetylglucosyl halides.

The tetraacetylglucosyl halides which are applicable for use in the process of this invention may be selected from the group consisting of 2,3,4,6-tetra-O-acetylglucosyl-1-chloride and 2,3,4,6-tetra - O - acetylglucosyl-1-bromide; both of the latter being compounds which are readily prepared by means of procedures well known to those skilled in the art. Thus, the latter compounds may be prepared by the reaction of glucose with acetyl halides or, more preferably, they are prepared by the reaction of a poly-O-acetylglucose with a hydrogen halide, a phosphorus halide or a titanium tetrahalide. It is to be understood that neither the tetraacetylglucosyl halides nor their method of preparation are being claimed as a novel aspect of this invention.

Although this invention is being described with respect to the use, therein, of tetraacetylglucosyl halides, it should be noted at this point that it is also possible to utilize a wide variety of poly-O-acylglycosyl halides in this process. Thus, in addition to the tetraacetylglucosyl halides, one may employ the corresponding tetraacetyl halide derivatives of various hexose and pentose monosaccharides including, for example, mannose, talose, galactose, rhamnose, ribose, and xylose as well as the corresponding disaccharides derived from the latter monosaccharides. However, for all practical purposes, the lower cost and greater availability of D-glucose dictates the preferred use of the tetraacetylglucosyl halides in the process of this invention. In addition, it should also be pointed out that although the tetraacetyl halide derivatives of glucose will be the preferred intermediates for use in this process, it is also possible to employ other tetraacyl and tetraaroyl glycosyl halides as, for example, the tetra-O-propionylglycosyl and the tetra-O-benzoylglycosyl halides.

As for the ethylenically unsaturated monomers which are reacted with the tetraacetylglucosyl halides in the process of this invention, it has already been noted that the latter may be selected from the group consisting of the monohydroxy substituted and the monocarboxy substituted ethylenically unsaturated monomers. Thus, among the representative monohydroxy substituted ethylenically unsaturated monomers which are applicable for use in this process, one may list, for example, hydroxyethyl methacrylate, hydroxyethyl acrylate, hydroxypropyl methacrylate, hydroxypropyl acrylate, ally alcohol and methallyl alcohol. Representative monocarboxy substituted ethylenically unsaturated monomers, which are applicable for use in this process, include, for example, acrylic, methacrylic, and crotonic acids as well as the $C_1$–$C_4$ alkyl monoesters of maleic and fumaric acids, i.e. the alkyl monoesters of maleic and fumaric acid wherein the alkyl groups of said monoesters may contain from one to four carbon atoms. All of the latter applicable ethylenically unsaturated monomers are thus seen to have in common with one another, the fact that they contain, as part of their respective molecules, either a hydroxy or a carboxy group which is free to react with the halide group of the tetraacetylglucosyl halide. For purposes of brevity, these monohydroxy and monocarboxy substituted ethylenically unsaturated monomers will be, hereinafter, referred to as "the vinyl monomers."

Referring, now, to the above given list representative of the monomeric sugar derivatives of this invention, it may be noted that derivatives 1a and 1b are the reaction products obtained when tetraacetylglucosyl halides are reacted, respectively, with hydroxyethyl methacrylate and hydroxyethyl acrylate; numbers 2a and 2b are obtained by reaction, respectively, with hydroxypropyl methacrylate and hydroxypropyl acrylate; numbers 3a and 3b are obtained by reaction, respectively, with allyl and methallyl alcohols; numbers 4a and 4b are obtained by reaction, respectively, with methacrylic and acrylic acids; number 5 is obtained by reaction with crotonic acid; number 6 is obtained by reaction with monomethyl maleate; and, number 7 is obtained by reaction with monobutyl fumarate.

The reaction between the vinyl monomer and the tetraacetylglucosyl halide which leads to the preparation of the novel derivatives of this invention takes place between the halide group of the tetraacetylglucosyl halide and the hydroxy group of the monohydroxy substituted vinyl monomer or the hydroxy group of the monocarboxy substituted vinyl monomer and produces, as a by-product, a hydrogen halide acid. In conducting the process of this invention, there is a choice between two techniques which may be employed as a means of removing this hydrogen halide acid by-product. The preferred technique involves conducting the reaction in an anhydrous organic solvent which may comprise any aromatic hydrocarbon or chlorinated hydrocarbon solvent such, for example, as benzene, toluene or chloroform. The actual removal of the hydrogen halide acid is effected by the presence in the system of a silver salt, selected from the group consisting of silver oxide and silver carbonate, which combines with the halide ion of the hydrogen halide acid to form the respective silver halide salt. The water which is produced as a result of the latter reaction must then be removed by means of a drying agent, such as anhydrous calcium sulfate, which should be present in the reaction vessel in order to prevent the hydrolysis of the tetraacetylglucosyl halide. In additon, there should also, preferably, be a catalyst in the system to aid in the initiation of the reaction and, for this purpose, iodine is ordinarily employed although sodium iodide and potassium iodide may also be utilized.

The other technique which may be employed for removing the hydrogen halide acid involves conducting the reaction between the vinyl monomer and the tetraacetylglucosyl halide in a heterocyclic organic base such, for example, as pyridine, quinoline, or isoquinoline, etc. which serves to remove the hydrogen halide in the form of the salt of the respective organic base. In this technique, the iodine catalyst should again, preferably, be present in the system although a drying agent is no longer required since, under these conditions, water is not produced.

With either of the above described techniques, the reaction is advantageously conducted at ambient temperatures in the range of from about 10 to 35° C. with optimum results being obtained at about 15° C. Ordinarily, the tetraacetylglucosyl halide is dissolved in either the anhydrous organic solvent or in the heterocyclic organic base and the resulting solution is then added dropwise, and with agitation, to the vinyl monomer which is ordinarily in liquid form. When the hydrogen halide acceptor which is utilized is a silver salt, the reaction is preferably conducted in darkness or in a blackened reaction vessel, in order to protect the photosensitive silver salts from premature reduction. It may be noted that with reaction temperatures substantially higher than 35° C., care must be taken to avoid any thermal decomposition of the tetraacetylglucosyl halide as well as any spontaneous polymerization of the vinyl monomer. As for the length of the reaction period, this will of course vary depending upon the particular reactants which are being utilized; however, at ambient temperatures, it will ordinarily be in the order of from about 6 to 24 hours.

With respect to the proportions of the reactants, it is preferred to employ a slight stoichiometric excess of the vinyl monomer which should be in the order of about 5 to 10% over the concentration of the tetraacetylglucosyl halide. Thus, although the reaction can readily be conducted with stoichiometrical equivalent concentrations of the latter reactants, the use of the slight excess of the vinyl monomer simplifies the subsequent isolation of the desired end product inasmuch as the tetraacetylglucosyl halide, which has solubility characteristics similar to the end product, will be completely reacted and thus removed from the system. The concentration of the hydrogen halide acceptor, i.e. the silver salt or the heterocyclic organic base, should be in a stoichiometric excess in the order of about 20 to 50% over the calculated, theoretical yield of the hydrogen halide acid which will be produced as a by-product of the reaction. In those cases where a silver salt is employed as the hydrogen halide acceptor, the amount of the anhydrous organic solvent which is used should be the minimum quantity required to dissolve the tetraacetylglucosyl halide while the drying agent should be present in a large stoichiometric excess with respect to the amount of water which will be produced. As for the iodine catalyst, the latter should be present in a concentration in the range of about 2.5 to 20.0%, by weight, of the amount of the tetraacetylglucosyl halide undergoing reaction.

Following the termination of the reaction, the desired derivative may be recovered by filtering the reaction mass, washing the residue with several portions of the particular solvent in which the reaction was conducted, and then thoroughly washing the filtrate with distilled water in order to remove any unreacted, residual vinyl monomer therefrom. The filtrate is thereupon dried over a suitable drying agent, such as anhydrous calcium sulfate, and then concentrated, under reduced pressure, at room temperature. The resulting viscous syrup is next crystallized with a solvent in which it is slightly soluble, such as diisopropyl ether or diethyl ether, the crystalline product washed with several portions of the solvent from which it was recrystallized and finally dried, at room temperature, under high vacuum. Alternatively, the pure product may be isolated from the syrup by distilling the latter under high vacuum after the addition, thereto, of a suitable polymerization inhibitor such as hydroquinone. Under these conditions, the resulting derivative contains hydroquinone which distills over along with the desired monomeric sugar derivative.

In general, the novel derivatives of this invention are white, crystalline solids at room temperature and are soluble in alcoholic, ketonic, aromatic hydrocarbon and chlorinated hydrocarbon solvents and are insoluble in water and petroleum ether. They are prepared, by means of the above described process, in yields which are in the order of about 25 to 70% of theory.

The fact that the process of this invention may be conducted at ambient temperatures is of considerable importance since it obviates the danger of the thermal decomposition of the tetraacetylglucosyl halide or of any spontaneous polymerization on the part of either the vinyl monomers which are taking part in the reaction or the novel monomeric sugar derivatives which result therefrom. Moreover, it is not necessary to introduce any polymerization inhibitors into the system inasmuch as the vinyl monomer solutions are ordinarily supplied with such an inhibitor already present therein in a concentration which is entirely adequate to prevent polymerization from occurring under the conditions of the reaction.

In utilizing these novel ethylenically unsaturated sugar derivatives in the preparation of homo- and copolymers, there may be employed any of the usual vinyl polymerization methods which are well known to those skilled in the art and which is particularly suited for the polymer whose preparation is desired. Thus, such polymers may be prepared by means of free radical initiated processes utilizing bulk, suspension, solution or emulsion polymerization techniques; or, they may be prepared with ionic catalysts or by means of stereospecific catalysts such as those of the type developed by Zeigler.

The comonomers which may be utilized together with the above described ethylenically unsaturated sugar derivatives for the preparation of the copolymers of this invention can be any ethylenically unsaturated monomer such, for example, as styrene; alpha-methyl styrene; the acrylic and methacrylic acid esters of aliphatic alcohols such as methyl, ethyl, propyl, butyl, isobutyl, amyl, hexyl, 2-ethylhexyl, octyl, lauryl, and stearyl alcohols; the dialkylaminoalkyl esters of acrylic and methacrylic acids; acrylamide, methacrylamide; acrylonitrile; methacrylonitrile; butadiene; isoprene; vinyl propionate; dibutyl maleate and fumarate; vinylidene chloride; vinyl chloride; vinyl acetate; ethylene; and propylene, etc. Any of these comonomers may be used either alone or in combination with one another together with one or more of the monomeric sugar derivatives of this invention.

The copolymers of this invention should contain a mole fraction of at least about 20% of these ethylenically unsaturated sugar derivatives in order to be able to obtain the benefits, as will be described below, which result from the presence in these copolymers of the moieties derived from these novel ethylenically unsaturated tetraacetylglucose derivatives. As for the maximum concentration, this will depend, of course, upon the particular comonomer as well as on the specific end use application of the resulting copolymer.

In any event, the homo- and copolymers of this invention, whether prepared by means of bulk, suspension, solution, or emulsion polymerization techniques, or by other means, are all characterized by their novel solubility characteristics which permit them to be prepared in a form which is either soluble or insoluble in water. This versatile property is made possible by the fact that, when initially prepared, the homo- and copolymers derived from the novel ethylenically unsaturated tetraacetylglucose derivatives of this invention are insoluble in water but are, rather, soluble in various organic solvents such as benzene, toluene, and chloroform. However, by effecting their deacetylation, i.e. by removing the acetyl groups from their tetraacetylglucose moieties, these homopolymers, as well as the copolymers containing, as described above, a mole fraction of at least about 20% of these novel sugar derivatives, will be converted into a deacetylated form wherein they are no longer soluble in organic solvents but are now, on the other hand, readily water soluble to a degree where they display a greater hydrophilic character than such presently available, and far more costly, water soluble polymers as polyacrylamide, polyvinyl alcohol and polyvinylpyrrolidone.

Thus, when deacetylated, the novel homo- and copolymers of this invention will contain mers, i.e. repetitive chemical structural units, with pendant groups having the following structural formula:

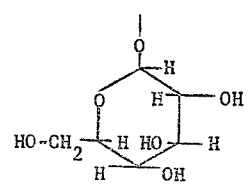

In effecting the deacetylation of the novel polymers of this invention, it is possible to employ any of the known procedures which are ordinarily utilized for the deacetylation of sugars. Thus, for example, one may react the polymer with a solution of sodium methoxide whereupon the resulting deacetylated polymer may be neutralized with a weak acid, such as acetic acid, purified by any convenient means, as for example by dialysis, and then finally dried.

The homo- and copolymers derived from the novel ethylenically unsaturated sugar derivatives of this invention, in either their acetylated or deacetylated forms, may be utilized in a wide variety of applications. Thus, for example, they may be employed as textile sizes, adhesives, additives for oil well drilling muds, as thickeners, and as films and coatings for various substrates including paper, paperboard, textiles, metals, and synthetic films such as cellophane, polyvinyl chloride, and polyethylene, etc.

The following examples will further illustrate the embodiment of this invention. In these examples all parts given are by weight unless otherwise noted.

*Example I*

This example illustrates the preparation of 2,3,4,6-tetra-O-acetylglucoxyethyl methacrylate, i.e.

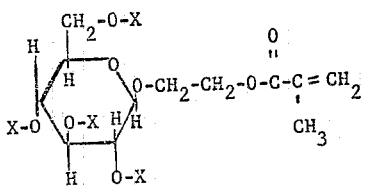

by means of the novel process of this invention. In the latter formula, and in the formulae in the examples which follow, X represents the acetyl group, i.e.

Into a three necked flask which had been painted black and which was fitted with a ground glass sealed stirrer, a calcium chloride drying tube, and a separatory funnel with a drying tube, there were introduced 10 parts of hydroxyethyl methacrylate along with 25 parts of silver carbonate, 25 parts of anhydrous calcium sulfate and 2 parts of iodine. The separatory funnel attached to the flask contained a solution of 25 parts of 2,3,4,6-tetra-O-acetyl-1-bromide dissolved in 50 parts of dry benzene, the latter solution being added to the other reagents, contained in the flask, dropwise and with agitation over a period of one hour. Under continued agitation, the reaction was allowed to proceed for 24 hours at a room temperature, i.e. 25° C.

The resulting reaction product was then removed from the flask, centrifuged in a black centrifuge bottle, the solid mass suspended in fresh benzene, centrifuged, and the centrifuged solution along with the washings concentrated under reduced pressure at a temperature of 25° C. The concentrated solution was thereupon washed with several portions of distilled water and dried with anhydrous sodium sulfate. The desired 2,3,4,6-tetra-O-acetylglucoxyethyl methacrylate, which will for purposes of brevity be hereinafter referred to as TAGEMA, was isolated from the benzene solution by being recrystallized from a solution of diisopropyl ether. The resulting crystalline TAGEMA had a melting point of 76–77° C., a specific rotation, in chloroform solution of $[\alpha]_{20}^{D}=-17.0°$, and was soluble in alcoholic, ketonic, aromatic hydrocarbon, and chlorinated hydrocarbon solvents and slightly soluble in diethyl and diisopropyl ether at room temperature. It had been produced in a yield of about 45% of theory.

In a repetition of the above described procedure, silver oxide was, in this case, substituted for silver carbonate with all other conditions remaining the same. A comparable yield of TAGEMA was obtained by means of this modified procedure.

In still another repetition of the above described procedure, 2,3,4,6-tetra-O-acetylglucosyl-1-chloride was, in this case substituted for the 2,3,4,6-tetra-O-acetylglucosyl-1-bromide with all other conditions remaining the same. A comparable yield of TAGEMA was obtained by means of this modified procedure.

*Example II*

This example illustrates the preparation of polytetra-O-acetylglucoxyethyl methacrylate, i.e. the homopolymer of TAGEMA; i.e.

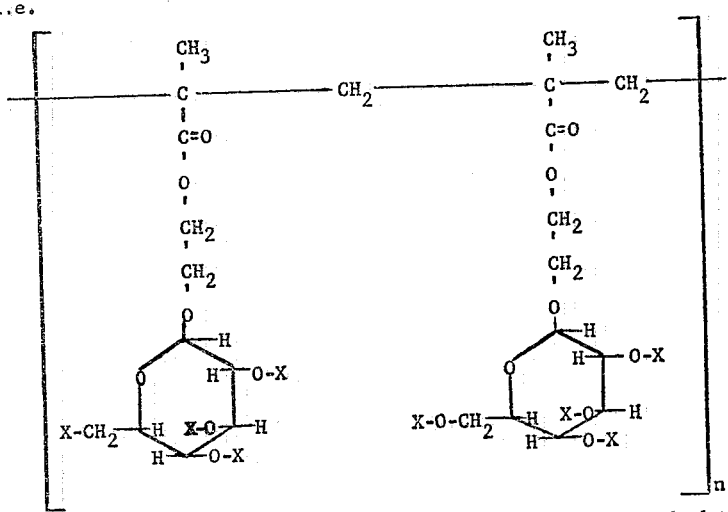

the above formula representing a typical mer in the latter homopolymer.

Into a glass ampoule were placed 0.004 part of azabisisobutyronitrile and 3.6 parts of benzene containing 2.05 parts of recrystallized TAGEMA, as prepared by means of the procedure of Example I, dissolved therein. Before sealing the ampoule, it was degassed, under high vacuum, the sealed ampoule then being immersed in an oil bath which was maintained at a temperature of 50° C. The polymerization proceeded for a period of 4.67 hours whereupon the polymer was isolated by precipitating the resulting viscous solution with methanol, redissolving in benzene, and reprecipitating with methanol. This procedure yielded polytetra-O-acetylglucoxyethyl methacrylate, hereinafter referred to as PTAGEMA, with a 78.9% conversion of TAGEMA. The intrinsic viscosity $[\eta]$, in benzene at 25° C., of the thus produced PTAGEMA, in deciliters per gram, was 0.76.

*Example III*

This example illustrates the deacetylation of PTAGEMA to polyglucoxyethyl methacrylate, i.e.

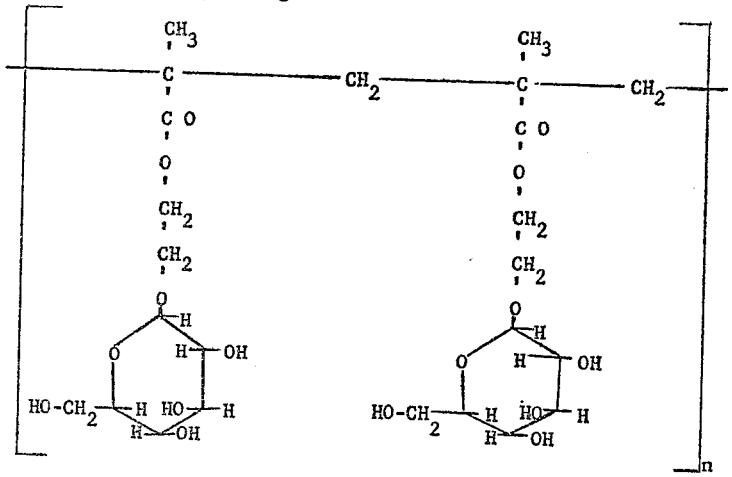

the above formula representing a typical mer in the latter homopolymer.

One part of PTAGEMA, as prepared by means of the procedure of Example II, was dissolved in 10 parts of chloroform, the resulting solution then being maintained in a cold bath, at a temperature of 3–4° C. To the chilled PTAGEMA solution, there was then slowly added 1.25 parts of a sodium methoxide solution which had been prepared by the addition of 0.5 part of sodium to 25 parts of absolute methanol. The solid product thus obtained was dissolved in water, neutralized with acetic acid, dialyzed and freeze-dried. This procedure yielded a white fluffy product which readily dissolved in water. The optical rotation of the thus produced polyglucoxyethyl methacrylate, in water solution was $[\alpha]_{20}{}^D = -15.0°$.

*Example IV*

This example illustrates the preparation of a number of different copolymers of TAGEMA.

The respective copolymers of TAGEMA with styrene, dimethylaminoethyl methacrylate, and ethyl acrylate prepared by weighing 4 parts of crystallized TAGEMA, as prepared by means of the procedure of Example I, into each of three glass ampoules whereupon freshly distilled sample of 1 part of each of the above identified comonomers along with 0.02 part of azobisisobutyronitrile dissolved in 8.37 parts of benzene were added to the ampoules which were then degassed under high vacuum and sealed. The sealed ampoules were immersed in an oil bath maintained at a temperature of 60° C. and the polymerization was allowed to proceed for 72 hours in the case of the styrene copolymer, for 4.1 hours in the case of the dimethylaminoethyl methacrylate copolymer, and for 3.5 hours in the case of the ethyl acrylate copolymer. Upon the completion of the respective polymerizations, the TAGEMA:styrene copolymer was precipitated with methanol while the TAGEMA:dimethylaminoethyl methacrylate and the TAGEMA:ethyl acrylate copolymers were precipitated with diisopropyl ether. All three copolymers were next reprecipitated from benzene solutions, freeze-dried, and finally dried at 40° C., under vacuum, for a period of 48 hours. The percent conversion of the resulting styrene copolymer was 85.6% and the mole fraction of TAGEMA contained therein was 0.66. The percent conversion of the resulting dimethylaminoethyl methacrylate copolymer was 82.01% and the mole fraction of TAGEMA contained therein was 0.33. The percent conversion of the resulting ethyl acrylate copolymer was 88.50% and the mole fraction of TAGEMA contained therein was 0.75. All three of the thus prepared copolymers were insoluble in water and soluble in a variety of organic solvents.

*Example V*

In this example the TAGEMA:styrene and the TAGEMA:dimethylaminoethyl methacrylate copolymers, whose preparation was described in Example IV, were each respectively deacetylated by means of the procedure described in Example III. The following table provides data relating to the resulting deacetylated copolymers.

| Sample | Parts of Sample Before Deacetylation | Actual Parts of Sample After Deacetylation | Theoretical Wt. of Sample After Deacetylation (Parts) |
|---|---|---|---|
| TAGEMA: styrene copolymer | 2.005 | 1.548 | 1.387 |
| TAGEMA: dimethylaminoethyl methacrylate copolymer | 2.063 | 1.520 | 1.640 |

The above data indicates that the deacetylation of the dimethylaminoethyl methacrylate copolymer had been complete. However, the fact that the actual weight of the deacetylated styrene copolymer was about 10% more than its theoretical weight indicates that deacetylation may not have been complete in this case. Both of the deacetylated samples were completely soluble in water yielding clear solutions. The infra-red spectrum of the freeze-dried, deacetylated TAGEMA:styrene copolymer showed an absorption band at 710 cm.$^{-1}$ for styrene. The latter facts definitely prove that the copolymer of TAGEMA with styrene had been formed since if the product obtained upon the polymerization of the two monomers were a mixture of two homopolymers, the deacetylated product would not have been completely soluble in water inasmuch as polystyrene is not, of course, water soluble. Moreover, the aqueous solution of the deacetylated product would, for the same reason, have not revealed the presence of styrene by means of infra-red analysis. The viscosity characteristics of the deacetylated TAGEMA:dimethylaminoethyl methacrylate copolymer, in aqueous solution at 25° C., displayed the typical behavior of a polyelectrolyte. Its optical rotation, in chloroform, was $[\alpha]_{20}{}^D = -15.5°$.

*Example VI*

This example illustrates the synthesis of 2,3,4,6-tetra-O-acetylglucoxyethyl acrylate, i.e.

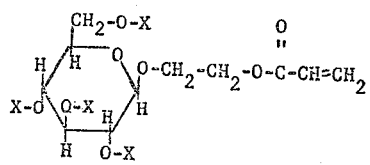

by means of the novel process of this invention. The latter product will be, hereinafter, referred to as TAGEA.

In preparing TAGEA, the procedure described in Example I, hereinabove, for the preparation of TAGEMA was followed in all particulars with the exception that hydroxyethyl acrylate was, in this case, substituted for hydroxyethyl methacrylate. The complete reaction mixture was as follows:

| | Parts |
|---|---|
| Hydroxyethyl acrylate (distilled) | 4.6 |
| Anhydrous calcium sulfate (powder) | 10.0 |
| Silver carbonate | 10.0 |
| Dry benzene | 25.0 |
| 2,3,4,6-tetra-O-acetylglucosyl-1-bromide | 15.0 |
| Iodine | 0.5 |

The resulting reaction product was then separated and purified in the manner described, in Example I, for TAGEMA. The final product distilled at a temperature of 195–200° C., at 0.15 mm. Hg, and was produced in a yield of 30% of the theoretical. Unlike TAGEMA, TAGEA did not easily crystallize. The distilled product had, first, to be passed through a silicic acid column and then dissolved in a diisopropyl ether solution which was stored in a refrigerator for a period of 15 days whereupon the TAGEA finally crystallized. The melting point of the thus crystallized TAGEA was 55–56° C. Its solubility characteristics were identical to those of TAGEMA. Its optical rotation, in chloroform, was $[\alpha]_{20}^D = -15.5$.

*Example VII*

This example illustrates the preparation of polytetra-O-acetylglucoxyethyl acrylate, i.e. the homopolymer of TAGEA.

Into a glass ampoule containing 0.06 part of azobisisobutyronitrile were placed 5.74 parts of a solution which had been prepared by the addition of 3.96 parts of TAGEA, as prepared by means of the procedure of Example VI, to 6.97 parts of benzene. The ampoule was thereupon degassed, under high vacuum, sealed, the sealed ampoule placed in an oil bath maintained at a temperature of 60° C., and the polymerization allowed to proceed for 7.7 hours. The resulting polymer was precipitated with methanol, dissolved in benzene, reprecipitated with methanol and dried, at 60° C. under vacuum, for a period of 24 hours. The conversion of monomer was 72%. The solubility characteristics of the thus prepared polytetra-O-acetylglucoxyethyl acrylate were identical to those of PTAGEMA.

*Example VIII*

This example illustrates the synthesis of 2,3,4,6-tetra-O-acetylglucoxypropyl acrylate, i.e.

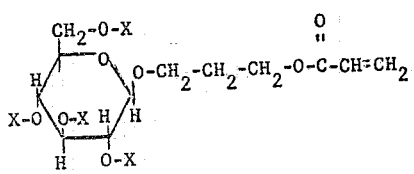

by means of the novel process of this invention. The latter product will be, hereinafter, referred to as TAGPA.

In preparing TAGPA, the procedure described in Example I, hereinabove, for the preparation of TAGEMA, was followed in all particulars with the exception that hydroxypropyl acrylate was, in this case, substituted for hydroxyethyl methacrylate. The complete reaction mixture was as follows:

| | Parts |
|---|---|
| Hydroxypropyl acrylate (distilled) | 10.0 |
| Anhydrous calcium sulfate (powder) | 25.0 |
| Silver carbonate | 25.0 |
| Dry benzene | 100.0 |
| 2,3,4,6-tetra-O-acetylglucosyl-1-bromide | 30.0 |
| Iodine | 2.0 |

The resulting reaction product was then separated and purified in the same manner described, in Example I, for TAGEMA except that the benzene solution, after washing with water, drying, and concentrating, was passed through a short column of silicic acid. Two fractions were collected, the second of which was colored. The first fraction was concentrated into a viscous syrup, dissolved in diisopropyl ether, and then kept in a refrigerator for 5 days. A portion of this product crystallized and it was filtered, washed three times with diisopropyl ether, and maintained under high vacuum for 24 hours. The melting point of the thus produced TAGPA was 95–96° C. Its optical rotation, in chloroform, was $[\alpha]_{20}^D = -20.4°$.

*Example IX*

This example illustrates the preparation of polytetra-O-acetylglucoxypropyl acrylate, i.e. the homopolymer of TAGPA.

Into a glass ampoule were placed 0.2 part of crystallized TAGPA, as prepared by means of the procedure of Example VIII, and 0.4 parts of a 1.0%, by weight, solution of azobisisobutyronitrile in benzene. The ampoule was then degassed under high vacuum, sealed, the sealed ampoule placed in an oil bath maintained at a temperature of 60° C., and the polymerization allowed to proceed for 3 hours. The resulting polymer was precipitated with methanol, dissolved in benzene, reprecipitated with methanol, freeze-dried from benzene solution, and finally dried at 60° C., under vacuum for a period of 24 hours. The conversion of monomer was 90%. The solubility characteristics of the thus prepared polytetra-O-acetylglucoxypropyl acrylate were identical to those of PTAGEMA.

*Example X*

This example illustrates the synthesis of 2,3,4,6-tetra-O-acetylglucosyl methacrylate, i.e.

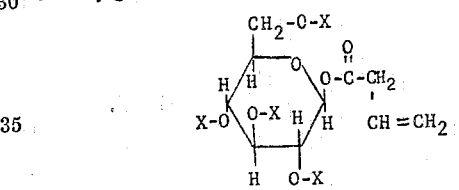

by means of the novel process of this invention. The latter product will be, hereinafter, referred to as TAGMA. Also illustrated will be the preparation of the homopolymer of TAGMA as well as the subsequent deacetylation of the latter homopolymer.

In preparing TAGMA, the procedure described in Example I, hereinabove, for the preparation of TAGEMA was followed in all particulars with the exception that methacrylic acid was, in this case, substituted for hydroxyethyl methacrylate. The complete reaction mixture was as follows:

| | Parts |
|---|---|
| Methacrylic acid | 5.0 |
| Silver carbonate | 20.0 |
| 2,3,4,6-tetra-O-acetylglucosyl-1-bromide | 30.0 |
| Iodine | 1.0 |
| Dry benzene | 80.0 |
| Anhydrous calcium sulfate | 25.0 |

The resulting reaction product was then isolated and purified in the same manner described, in Example I, for TAGEMA except that the final product was twice crystallized from a 15:1 mixture of diisopropyl ether and methanol. The thus produced TAGMA was in the form of white, needle shaped crystals having a melting point of 106–107° C. and a specific rotation, in chloroform, of $[\alpha]_{20}^D = -4.3°$. It had been produced in a yield of 33% of theory and its solubility characteristics were comparable to those of TAGEMA with the exception that it was substantially less soluble in diisopropyl ether and diethyl ether.

With azobisisobutylronitrile as an initiator and using the polymerization procedure described in Example II, the homopolymer of TAGMA was prepared at a reaction temperature of 50° C. The resulting polytetra-O-acetylglucosyl methacrylate was soluble in aromatic hydrocarbon, ketonic, and chlorinated hydrocarbon solvents and was insoluble in ethanol, diethyl ether, aliphatic hydrocarbons and water. The latter homopolymer was then deacetylated by means of the procedure described in Example III for the deacetylation of PTAGEMA. The thus produced polyglucosyl methacrylate was found to be readily water soluble.

Example XI

This example illustrates the synthesis of 2,3,4,6-tetra-O-acetylglucosyl acrylate, i.e.

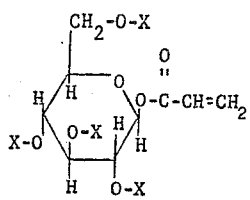

by means of the novel process of this invention. The latter product will be, hereinafter, referred to as TAGA. Also illustrated will be the preparation of the homopolymer of TAGA.

In preparing TAGA, the procedure described in Example I, hereinabove, for the preparation of TAGEMA was followed in all particulars with the exception that acrylic acid was, in this case, substituted for hydroxyethyl methacrylate. The complete reaction mixture was so follows:

| | Parts |
|---|---|
| Acrylic acid | 5.0 |
| Silver carbonate | 20.0 |
| 2,3,4,6-tetra-O-acetylglucosyl-1-bromide | 30.0 |
| Iodine | 1.0 |
| Dry benzene | 80.0 |
| Anhydrous calcium sulfate | 25.0 |

The resulting reaction product was then isolated and purified in the same manner described, in Example I, for TAGEMA except that the final product was twice crystallized from a 15:1 mixture of diisopropyl ether and methanol. The thus produced TAGA was in the form of white, granular crystals having a melting point of 103–104° C. and a specific rotation, in chloroform, of $[\alpha]_{20}^D = -1.9°$. It had been produced in a yield of 32% of theory and its solubility characteristics were comparable to those of TAGEMA with the exception that it was substantially less soluble in diisopropyl ether and diethyl ether.

With azobisisobutyronitrile as an initiator and using the polymerization procedure described in Example II, the homopolymer of TAGA was prepared at a reaction temperature of 50° C. The resulting polytetra-O-acetylglucosyl acrylate was soluble in aromatic hydrocarbon, ketonic, and chlorinated hydrocarbon solvents and was insoluble in ethanol, diethyl ether, aliphatic hydrocarbons and water.

Example XIII

This example illustrates the synthesis of 2,3,4,6-tetra-O-acetylglucoxypropyl methacrylate, i.e.

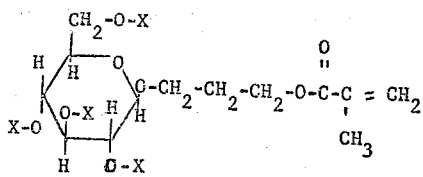

by means of the novel process of this invention. The latter product will be, hereinafter referred to as TAGPMA. Also illustrated will be the preparation of the homopolymer of TAGPMA.

In preparing TAGPMA, the procedure described in Example I, hereinabove, for the preparation of TAGEMA was followed in all particulars with the exception that hydroxypropyl methacrylate was, in this case, substituted for hydroxyethyl methacrylate. The complete reaction mixture was as follows:

| | Parts |
|---|---|
| Hydroxypropyl methacrylate | 10.0 |
| Anhydrous calcium sulfate (powder) | 25.0 |
| Silver carbonate | 25.0 |
| Dry benzene | 100.0 |
| 2,3,4,6-tetra-O-acetylglucosyl-1-bromide | 30.0 |
| Iodine | 2.0 |

The resulting reaction product was then isolated and purified in the same manner described, in Example I, for TAGEMA except that instead of washing the concentrated viscous syrup of TAGPMA with water, it was necessary to pass it through a short column of silicic acid in order to remove the unreacted hydroxypropyl methacrylate. After passing through the silicic acid column, the solution was again concentrated to a viscous syrup under reduced pressure. The syrup was then distilled, under vacuum, after adding a small quantity of hydroquinone. A highly viscous product was obtained at 195–200° C. and 0.06 mm. Hg. An unsuccessful attempt was made to crystallize the distilled viscous product from diisopropyl ether. The TAGPMA had been produced in a yield of 67.5% of theory and its specific rotation, in chloroform, was $[\alpha]_{20}^D = -12.4°$. Its solubility characteristics were the same as those of TAGEMA.

With azobisisobutyronitrile as an initiator and using the polymerization procedure described in Example II, the homopolymer of a freshly distilled sample of TAGPMA was prepared at a reaction temperature of 50° C. The resulting polytetra-O-acetylglucoxypropyl methacrylate was found to have soluble characteristics similar to those of PTAGEMA.

Summarizing, the process of this invention is thus seen to provide the practitioner with novel monomeric sugar derivatives which may be utilized to prepare either homopolymers or copolymers with other vinyl type comonomers. Variations may be made in proportions, procedures and materials without departing from the scope of this invention as limited by the following claims.

What is claimed is:

1. The monomeric sugar derivatives selected from the group consisting of

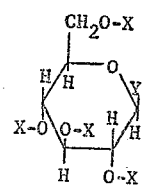

wherein X is an acetyl radical; wherein Y is a radical selected from the group consisting of the

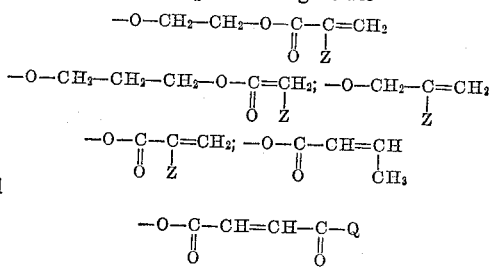

radicals, wherein Z in the latter radicals may be selected from the group consisting of the hydrogen and methyl radicals and wherein Q in the latter radicals is an oxyalkyl group containing from 1 to 4 carbon atoms.

2. 2,3,4,6-tetra-O-acetylglucoxyethyl methacrylate.
3. 2,3,4,6-tetra-O-acetylglucoxyethyl acrylate.
4. 2,3,4,6-tetra-O-acetylglucoxypropyl methacrylate.
5. 2,3,4,6-tetra-O-acetylglucoxypropyl acrylate.
6. 1-O-allyl 2,3,4,6-tetra-O-acetylglucoside.
7. 1-O-methallyl 2,3,4,6-tetra-O-acetylglucoside.
8. 2,3,4,6-tetra-O-acetylglucosyl methacrylate.

15

9. 2,3,4,6-tetra-O-acetylglucosyl acrylate.
10. 2,3,4,6-tetra-O-acetylglucosyl crotonate.
11. The 2,3,4,6-tetra-O-acetylglucosyl alkyl maleates wherein said alkyl group contains from one to four carbon atoms.
12. The 2,3,4,6-tetra-O-acetylglucosyl alkyl fumarates wherein said alkyl group contains from one to four carbon atoms.
13. The process of preparing the monomeric sugar derivatives selected from the group consisting of $$\text{structure: pyranose ring with } CH_2O\text{-}X, \text{ O, Y, O-X, H, O-X, O-X substituents}$$

wherein X is an acetyl radical; wherein Y is a radical selected from the group consisting of the $$-O-CH_2-CH_2-O-\underset{\underset{Z}{|}}{\overset{\overset{O}{\|}}{C}}-C=CH_2;\ -O-CH_2-CH_2-CH_2-O-\underset{\underset{Z}{|}}{\overset{\overset{O}{\|}}{C}}-C=CH_2$$

$$-O-CH_2-\underset{Z}{\overset{|}{C}}=CH_2;\ -O-\underset{\overset{\|}{O}}{C}-\underset{Z}{\overset{|}{C}}=CH_2;\ -O-\underset{\overset{\|}{O}}{C}-CH=\underset{CH_3}{\overset{|}{CH}}$$

and $$-O-\underset{\overset{\|}{O}}{C}-CH=CH-\underset{\overset{\|}{O}}{C}-Q$$

radicals wherein Z in the latter radicals may be selected from the group consisting of the hydrogen and methyl radicals and wherein Q in the latter radicals is an oxyalkyl group containing from 1 to 4 carbon atoms, said process comprising the reaction, at a temperature in the range of from about 10 to 35° C. and for a period of from about 6 to 24 hours, between an ethylenically unsaturated monomer and a 2,3,4,6-tetra-O-acetyl α-D-glucopyranosyl halide; said ethylenically unsaturated monomer being selected from the group consisting of monohydroxy substituted and monocarboxy substituted ethylenically unsaturated monomers; said 2,3,4,6-tetra-O-acetyl α-D-glucopyranosyl halide being selected from the group consisting of the 2,3,4,6-tetra-O-acetyl α-D-glucopyranosyl chlorides and bromides; a hydrogen halide acceptor also being present in the reaction mixture.

14. The process of preparing 2,3,4,6-tetra-O-acetylglucoxyethyl methacrylate which comprises the reaction, at a temperature in the range of from about 10 to 35° C. and for a period of from about 6 to 24 hours, between hydroxyethyl methacrylate and 2,3,4,6-tetra-O-acetyl-1-bromide in the presence of a hydrogen halide acceptor.

15. The process of preparing 2,3,4,6-tetra-O-acetylglucoxyethyl acrylate which comprises the reaction, at a temperature in the range of from about 10 to 35° C. and for a period of from about 6 to 24 hours, between hydroxyethyl acrylate and 2,3,4,6-tetra-O-acetylglucosyl-1-bromide in the presence of a hydrogen halide acceptor.

16. The process of preparing 2,3,4,6-tetra-O-acetylglucoxypropyl acrylate which comprises the reaction, at a temperature in the range of from about 10 to 35° C. and for a period of from about 6 to 24 hours, between hydroxypropyl acrylate and 2,3,4,6-tetra-O-acetylglucosyl-1-bromide in the presence of a hydrogen halide acceptor.

17. The process of preparing 2,3,4,6-tetra-O-acetylglucosyl methacrylate which comprises the reaction, at a temperature in the range of from about 10 to 35° C. and for a period of from about 6 to 24 hours, between methacrylic acid and 2,3,4,6-tetra-O-acetylglucosyl-1-bromide in the presence of a hydrogen halide acceptor.

18. The process of preparing 2,3,4,6-tetra-O-acetylglucosyl acrylate which comprises the reaction, at a tem-

16 perature in the range of from about 10 to 35° C. and for a period of from about 6 to 24 hours, between acrylic acid and 2,3,4,6-tetra-O-acetylglucosyl-1-bromide in the presence of a halide acceptor.

19. The process of preparing 2,3,4,6-tetra-O-acetylglucoxypropyl methacrylate which comprises the reaction, at a temperature in the range of from about 10 to 35° C. and for a period of from about 6 to 24 hours, between hydroxypropyl methacrylate and 2,3,4,6-tetra-O-acetylglucosyl-1-bromide in the presence of a hydrogen halide acceptor.

20. A polymer prepared from at least one monomeric sugar derivative selected from the group consisting of $$\text{structure: pyranose ring with } CH_2O\text{-}X, \text{ O, Y, O-X, H, O-X, O-X substituents}$$

wherein X is an acetyl radical; wherein Y is a radical selected from the group consisting of the $$-O-CH_2-CH_2-O-\underset{\underset{Z}{|}}{\overset{\overset{O}{\|}}{C}}-C=CH_2;\ -O-CH_2-CH_2-CH_2-O-\underset{\underset{Z}{|}}{\overset{\overset{O}{\|}}{C}}-C=CH_2;\ -O-CH_2-\underset{Z}{\overset{|}{C}}=CH_2;\ -O-\underset{\overset{\|}{O}}{C}-\underset{Z}{\overset{|}{C}}=CH_2;\ -O-\underset{\overset{\|}{O}}{C}-CH=\underset{CH_3}{\overset{|}{CH}}$$

and $$-O-\underset{\overset{\|}{O}}{C}-CH=CH-\underset{\overset{\|}{O}}{C}-Q$$

radicals, wherein Z in the latter radicals may be selected from the group consisting of the hydrogen and methyl radicals and wherein Q in the latter radicals is an oxyalkyl group containing from 1 to 4 carbon atoms.

21. A copolymer prepared from at least one monomeric sugar derivative selected from the group consisting of $$\text{structure: pyranose ring with } CH_2O\text{-}X, \text{ O, Y, O-X, H, O-X, O-X substituents}$$

wherein X is an acetyl radical; wherein Y is a radical selected from the group consisting of the $$-O-CH_2-CH_2-O-\underset{\underset{Z}{|}}{\overset{\overset{O}{\|}}{C}}-C=CH_2;\ -O-CH_2-CH_2-CH_2-O-\underset{\underset{Z}{|}}{\overset{\overset{O}{\|}}{C}}-C=CH_2$$

$$-O-CH_2-\underset{Z}{\overset{|}{C}}=CH_2;\ -O-\underset{\overset{\|}{O}}{C}-\underset{Z}{\overset{|}{C}}=CH_2;\ -O-\underset{\overset{\|}{O}}{C}-CH=\underset{CH_3}{\overset{|}{CH}}$$

and $$-O-\underset{\overset{\|}{O}}{C}-CH=CH-\underset{\overset{\|}{O}}{C}-Q$$

radicals, wherein Z in the latter radicals may be selected from the group consisting of the hydrogen and methyl radicals and wherein Q in the latter radicals is an oxyalkyl group containing from 1 to 4 carbon atoms; and at least one other ethylenically unsaturated comonomer; said copolymer containing a mole fraction of at least 20% of said monomeric sugar derivative.

22. The homopolymer of 2,3,4,6-tetra-O-acetylglucoxyethyl methacrylate.

23. The copolymer of 2,3,4,6-tetra-O-acetylglucoxyethyl methacrylate and styrene; said copolymer containing a mole fraction of at least 20% of said 2,3,4,6-tetra-O-acetylglucoxyethyl methacrylate.

24. The copolymer of 2,3,4,6-tetra-O-acetylglucoxyethyl methacrylate and dimethylaminoethyl methacrylate; said copolymer containing a mole fraction of at least 20% of said 2,3,4,6-tetra-O-acetylglucoxyethyl methacrylate.

25. The copolymer of 2,3,4,6-tetra-O-acetylglucoxyethyl methacrylate and ethyl acrylate; said copolymer containing a mole fraction of at least 20% of said 2,3,4,6-tetra-O-acetylglucoxyethyl methacrylate.

26. The homopolymer of 2,3,4,6-tetra-O-acetylglucoxyethyl acrylate.

27. The homopolymer of 2,3,4,6-tetra-O-acetylglucoxypropyl acrylate.

28. The homopolymer of 2,3,4,6-tetra-O-acetylglucosyl methacrylate.

29. The homopolymer of 2,3,4,6-tetra-O-acetylglucosyl acrylate.

30. The homopolymer of 2,3,4,6-tetra-O-acetylglucoxypropyl methacrylate.

31. A deacetylated polymer prepared from at least one monomeric sugar derivative selected from the group consisting of

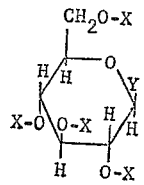

wherein X is an acetyl radical; wherein Y is a radical selected from the group consisting of the

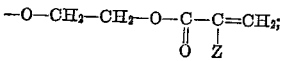

 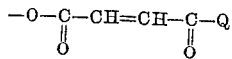

and $$-O-\overset{\|}{\underset{O}{C}}-CH=CH-\overset{\|}{\underset{O}{C}}-Q$$

radicals, wherein Z in the latter radicals may be selected from the group consisting of the hydrogen and methyl radicals and wherein Q in the latter radicals is an oxyalkyl group containing from 1 to 4 carbon atoms; said deacetylated polymer containing mers with pendant groups having the following structural formula:

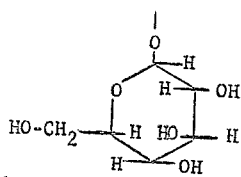

32. A deacetylated copolymer prepared from at least one monomeric sugar derivative selected from the group consisting of

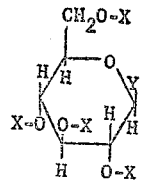

wherein X is an acetyl radical; wherein Y is a radical selected from the group consisting of the

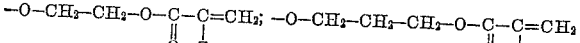

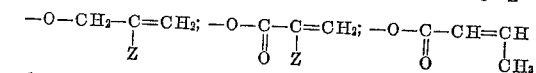

and

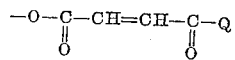

radicals, wherein Z in the latter radicals may be selected from the group consisting of the hydrogen and methyl radicals and wherein Q in the latter radicals is an oxyalkyl group containing from 1 to 4 carbon atoms; and at least one other ethylenically unsaturated comonomer; said deacetylated copolymer containing mers with pendant groups having the following structural formula:

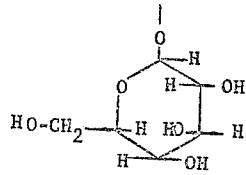

said deacetylated copolymer containing a mole fraction of at least 20% of said monomeric sugar derivative.

33. Polyglucoxyethyl methacrylate.

34. The deacetylated copolymer of 2,3,4,6-tetra-O-acetylglucoxyethyl methacrylate and styrene; said deacetylated copolymer containing a mole fraction of at least 20% of said 2,3,4,6-tetra-O-acetylglucoxyethyl methacrylate.

35. The deacetylated copolymer of 2,3,4,6-tetra-O-acetylglucoxyethyl methacrylate and dimethylaminoethyl methacrylate; said deacetylated copolymer containing a mole fraction of at least 20% of said 2,3,4,6-tetra-O-acetylglucoxyethyl methacrylate.

36. Polyglucosyl methacrylate.

No references cited.

JOSEPH L. SCHOFER, *Primary Examiner.*

H. WONG, JR., *Assistant Examiner.*